April 9, 1957     T. E. CROCKETT     2,787,793
TOILET TANK FLOAT VALVE
Filed Oct. 18, 1955
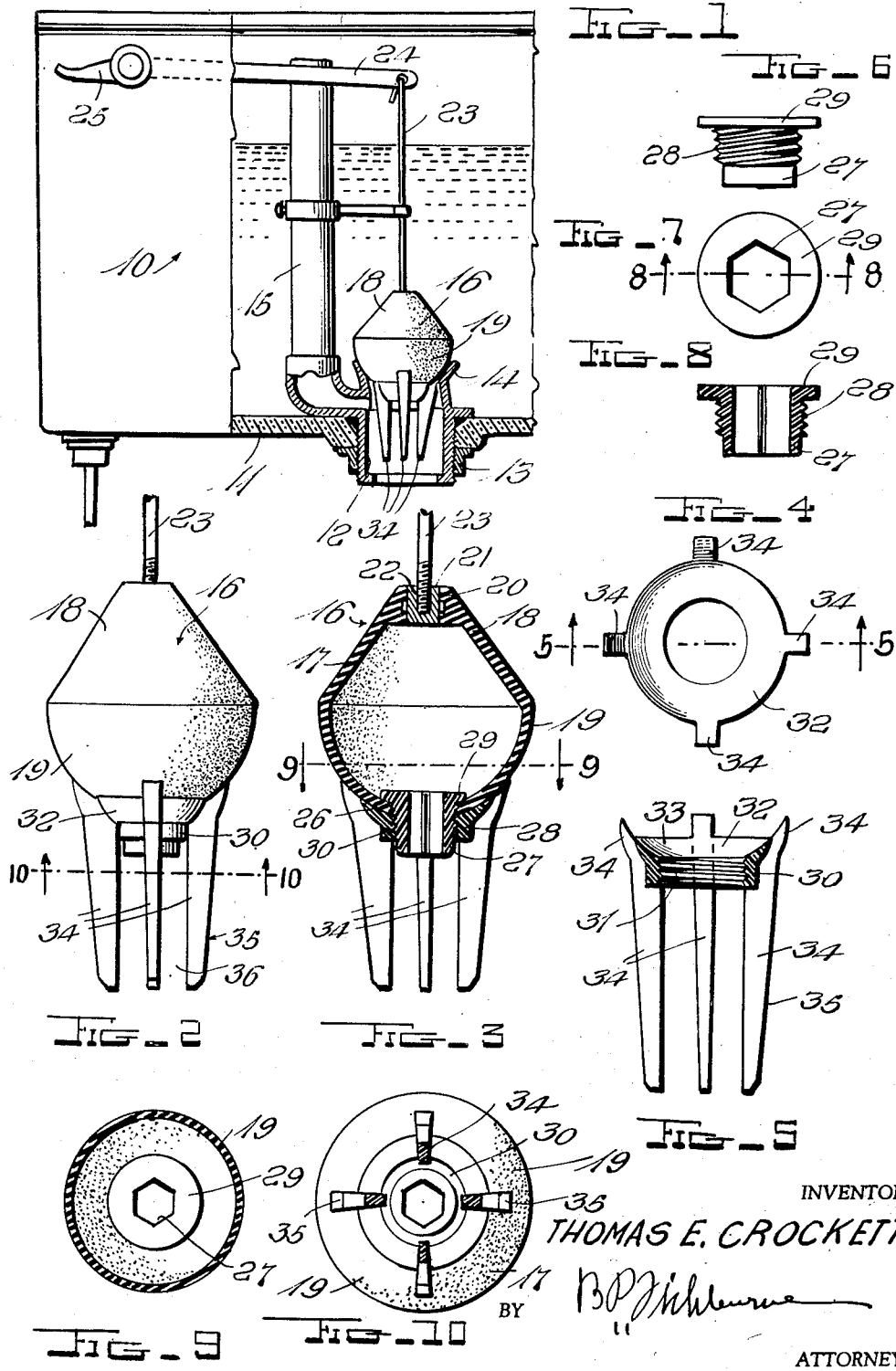
INVENTOR
THOMAS E. CROCKETT,
BY
ATTORNEY

United States Patent Office 2,787,793
Patented Apr. 9, 1957

2,787,793

TOILET TANK FLOAT VALVE

Thomas E. Crockett, Corpus Christi, Tex.

Application October 18, 1955, Serial No. 541,201

1 Claim. (Cl. 4—57)

My invention relates to a float valve for a toilet tank.

An important object of the invention is to provide an inexpensive and simple device for attaching the guide means to the float valve.

A further object of the invention is to provide a coupling device for the guide means, which coupling device may be applied to float valves of different sizes.

A further object of the invention is to provide a coupling device of the above-mentioned character which may be conveniently manipulated for connecting and disconnecting the guide unit with the float valve.

Other objects and advantages of the invention will be apparent during the course of the following description.

In the accompanying drawings forming a part of this application and in which like numerals are employed to designate like parts throughout same, Figure 1 is a side elevation of a float valve unit and guide means embodying my invention, showing the same in use, associated elements being shown in central vertical section, Figure 2 is a side elevation of the float valve unit removed, Figure 3 is a central vertical longitudinal section through the float valve unit, Figure 4 is a plan view of the guide device, Figure 5 is a longitudinal section taken on line 5—5 of Figure 4, the guide fingers being shown in elevation, Figure 6 is a side elevation of an inner coupling element, Figure 7 is a plan view of the same, Figure 8 is a longitudinal section taken on line 8—8 of Figure 7, Figure 9 is a horizontal section taken on line 9—9 of Figure 3, and, Figure 10 is a similar view taken on line 10—10 of Figure 2.

In the drawings, where for the purpose of illustration is shown a preferred example of the same, the numeral 10 designates a toilet or flush tank, having water supplied thereto by the usual float control means, not shown. The tank 10 has a bottom 11, having an opening formed therein for receiving a tubular coupling 12, held in place by a ring 13. The coupling extends above the bottom 11 and is provided with an upstanding valve seat 14, and a vertical overflow pipe 15 leads into the coupling 12, beneath the valve seat 14. This construction is conventional and is like that shown in my Patent 2,705,808.

My invention resides in a float valve unit 16, comprising a hollow float valve 17, which is formed of rubber and hence is elastic and flexible. The hollow float valve 17 includes an upper conical portion 18 and a lower spherically curved portion 19 formed integral. Arranged within an opening 20 in the top of the float valve 17 is a metallic sleeve 21, held therein by any suitable means, and this sleeve has a screw-threaded opening 22 to receive the lower screw-thread end of a rod 23, the upper end of which is hooked and may be secured within an opening formed in a lever 24. This lever is mounted for pivotal swinging movement and is arranged within the tank 10 and is swung by a hand operated lever 25 upon the exterior of the tank 10.

The lower end of the spherically curved portion 19 is provided with a large opening 26 to receive an inner tubular coupling 27, which is exteriorly threaded, as shown at 28. This tubular coupling is provided at its upper or inner end with an outwardly projecting radial flange 29, as shown.

The guide device comprises an outer ring 30, internally screw-threaded at 31 to engage with the threads 28. The outer ring is provided at its upper end with an annular flange 32, projecting above the ring 30 and extending radially outwardly beyond the ring 30. The flange 32 is inclined in vertical cross section and its inner face 33 is spherically curved. Preferably formed integral with the ring 30 and flange 32 are substantially vertical guide fingers 34, which project below the ring 30 for a substantial distance and are adapted to enter the tubular valve seat 14 and tubular coupling 12. The fingers 34 have outer vertically inclined faces 35 and these fingers are circumferentially spaced providing passages 36. The fingers 34 extend a short distance above the flange 32, as shown.

To apply the guide device to the float valve 17, the lower portion 19 of the float valve is stretched adjacent to the opening 26, to increase the size of this opening and the flange 29 of the inner tubular coupling 27 is inserted through the opening 26 and will be brought to the position adjacent to the bottom of the lower portion 19, as shown in Figure 3. The ring 30 is now applied to the lower end of the inner tubular coupling 27 and screwed up upon the same and the flange 32 is thereby brought into clamping engagement with the lower portion 19, adjacent to the opening 26. The portion 19 adjacent to the opening 26 is therefore clamped between the flanges 29 and 32, thus securely attaching the guide device to the float valve 17. Attention is called to the fact that the annular flange 29 has a considerably smaller diameter than the flange 32 which projects radially beyond the flange 29. When screwing the ring 30 upon the tubular coupling 27, the float valve 17 may be held in one hand and pressure applied by the fingers to the flange 29 and the lower portion 19 of the float valve. These parts may be securely held against rotation. During the operation, since the flange 32 extends radially beyond the flange 29, the flange 32 will serve as a stop to prevent the fingers from slipping off of that portion of the valve 17 adjacent to the flange 29. The same is true when the ring is unscrewed from the inner coupling 27. The inner coupling 27 provides a vent for the interior of the hollow float valve 17. It is obvious that the guide device, with the attaching means described, may be applied to hollow float valves of various sizes.

When the tank is flushed, the lever 24 is swung upwardly and the float valve 17 unseated. The guide fingers 34 remain within the valve seat 14. When the float valve 17 descends, the guide fingers 34 will properly seat the float valve, and the lower portion 19 contacts with the valve seat above the upper extensions of the fingers 34.

It is to be understood that the form of my invention herewith shown and described is to be taken as a preferred example of the same and that various changes in the shape, size and arrangement of parts may be resorted to, without departing from the spirit of my invention or the scope of the subjoined claim.

Having thus described my invention, I claim:

A float valve device for toilet tanks, comprising a flexible elastic hollow valve having a lower portion which tapers downwardly to be arranged upon a valve seat, said lower portion having an opening in the bottom thereof, an elongated tubular coupling mounted within said opening and extending inwardly and outwardly beyond the opening in said lower portion, said tubular coupling being provided at its inner end with a flange which is permanently secured thereto and projects radially beyond said elongated tubular coupling and said opening and disposed inwardly of said lower portion, the outer end of said tubular coupling extending below said lower portion, said elongated tubular coupling being exteriorly threaded and the threads being arranged outwardly of said flange and extending to the outer end of said tubular coupling, a ring arranged exteriorly of said lower portion and adjacent to said opening to receive the outer lower end of said tubular coupling and internally threaded to engage the exterior threads of said elongated tubular coupling, said ring being provided at its inner end which a flange extending radially outwardly beyond said ring, said ring flange engaging said lower portion and serving to clamp the lower portion against said flange of said elongated tubular coupling, and circumferentially spaced fingers formed integral with the ring and the flange carried by the ring and extending longitudinally of said elongated tubular coupling and projecting downwardly below said elongated tubular coupling for a substantial distance, said fingers having outer inclined faces which converge downwardly, said inclined faces serving to contact with the valve seat and center the hollow valve with respect to the valve seat when said valve moves downwardly with relation to the valve seat, said hollow valve having its lower portion projecting radially beyond said fingers.

References Cited in the file of this patent
UNITED STATES PATENTS

| | | |
|---|---|---|
| 1,997,728 | Heath | Apr. 16, 1935 |
| 2,526,936 | Crandall | Oct. 24, 1950 |
| 2,705,808 | Crockett | Apr. 12, 1955 |